(12) United States Patent
Uchida et al.

(10) Patent No.: US 11,354,291 B2
(45) Date of Patent: Jun. 7, 2022

(54) SEARCH DEVICE, SEARCH METHOD, AND SEARCH PROGRAM

(71) Applicant: Nippon Telegraph and Telephone Corporation, Tokyo (JP)

(72) Inventors: Hiroshi Uchida, Tokyo (JP); Hitoshi Kaneko, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/969,468

(22) PCT Filed: Feb. 15, 2019

(86) PCT No.: PCT/JP2019/005667
§ 371 (c)(1),
(2) Date: Aug. 12, 2020

(87) PCT Pub. No.: WO2019/160107
PCT Pub. Date: Aug. 22, 2019

(65) Prior Publication Data
US 2021/0011897 A1    Jan. 14, 2021

(30) Foreign Application Priority Data
Feb. 16, 2018    (JP) .............................. JP2018-026499

(51) Int. Cl.
*G06F 16/22* (2019.01)
*G06F 16/2455* (2019.01)

(52) U.S. Cl.
CPC ...... *G06F 16/2255* (2019.01); *G06F 16/2282* (2019.01); *G06F 16/24564* (2019.01)

(58) Field of Classification Search
CPC ............ G06F 16/2255; G06F 16/2282; G06F 16/24564; G06F 16/9027; G06F 16/90339; H04L 45/7453; H04L 63/0254; H04L 67/104; H04L 67/1065; H04L 67/1097
See application file for complete search history.

(56) References Cited

U.S. PATENT DOCUMENTS 6,389,419 B1 *    5/2002    Wong ..................... H04L 45/745
                                                  707/747
7,234,021 B1 *    6/2007    Chilton ............... G06F 12/0866
                                                  711/113
2016/0094393 A1 *    3/2016    Kaneko ................. G06F 16/215
                                                  709/220

OTHER PUBLICATIONS

ALAXALA Networks Co., Ltd., "Technology that supports packet forwarding (2) Internal details of hardware processing routers." ALAXALA. Nov. 20, 2012, 84 pages (with English Translation).

* cited by examiner

*Primary Examiner* — Albert M Phillips, III
(74) *Attorney, Agent, or Firm* — Fish & Richardson P.C.

(57) ABSTRACT

A storage unit (12) stores a hash table that corresponds to a predetermined field of a packet and has a set of a hash value from a value in the corresponding field and a pointer registered, and an ANY point table that corresponds to the predetermined field and has a pointer registered. A search unit (132) refers to a hash value calculated from a value in a field of a packet to be searched and to a pointer registered in the hash table and the ANY point table, to perform hash search for a rule corresponding to the packet to be searched.

9 Claims, 7 Drawing Sheets

SEARCH DEVICE, SEARCH METHOD, AND SEARCH PROGRAM

CROSS-REFERENCE TO RELATED APPLICATIONS

This application is a National Stage application under 35 U.S.C. § 371 of International Application No. PCT/JP2019/005667, having an International Filing Date of Feb. 15, 2019, which claims priority to Japanese Application Serial No. 2018-026499, filed on Feb. 16, 2018. The disclosure of the prior application is considered part of the disclosure of this application, and is incorporated in its entirety into this application.

TECHNICAL FIELD

The present invention relates to a search apparatus, a search method, and a search program.

BACKGROUND ART

TCAM (Ternary Content Addressable Memory), hash search, binary tree search, and the like have been conventionally known as rapid approaches for searching a rule corresponding to an IP packet. Among these approaches, TCAM is particularly high-speed, but costs of power consumption and the like are high. On the other hand, it is known that the hash search can be performed as fast as TCAM if conditions are met.

CITATION LIST

Non Patent Literature

NPL 1: ALAXALA Networks Corporation, Product Development Department, "Details of Inside of Hardware Processing Router: Technology Supporting D1 Packet Forwarding" Internet Week 2012 presentation, Nov. 20, 2012 [online], [Search on Feb. 2, 2018], Internet (https://www.nic.ad.jp/ja/materials/iw/2012/proceedings/d1/d1-uchiya.pdf)

SUMMARY OF THE INVENTION

Technical Problem

However, conventional techniques suffer from the problem that it may be difficult to search for the rule corresponding to the packet. Here, as described above, TCAM is high speed but is also expensive. Also, hash search can be performed at lower costs and at an equivalent speed as compared to TCAM if condition are met but conversely, if the conditions are not met, the search speed for the hash search is lower than that of TCAM. Note that binary tree search is more advantageous than hash search in terms of executable conditions, but is inferior to hash search in terms of speed.

For example, when performing hash search for the rule, a hash table is constructed based on a value set as the search condition in each field of the packet. At this time, when the search condition in any field is an ANY condition, it is difficult to construct the hash table.

Means for Solving the Problem

In order to solve the above-described problems and achieve the object, a search apparatus according to the present invention includes: a storage unit configured to store a hash table corresponding to a predetermined field of a packet, the hash table having a set of a hash value from a value for the corresponding field and a pointer registered, and an ANY point table corresponding to the predetermined field, the ANY point table having a pointer registered; and a search unit configured to refer to the hash value calculated from a value for a field of a packet to be searched and to a pointer registered in the hash table and the ANY point table to perform hash search for a rule corresponding to the packet to be searched.

Effects of the Invention

According to the invention, search for a rule corresponding to a packet may be made efficiently.

DESCRIPTION OF EMBODIMENTS

Embodiments of a search apparatus, a search method, and a search program according to the present application will be described in detail below with reference to drawings. Note that the present invention is not limited to the embodiments described below.

First Embodiment

Configuration of First Embodiment

Figures 1, 2:
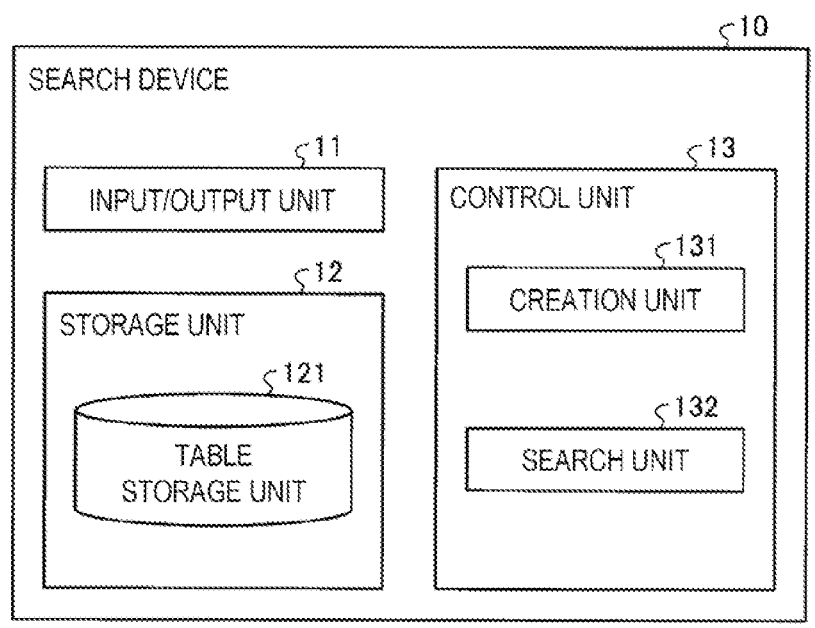
FIG. 1 is a view illustrating an example of a configuration of a search apparatus according to a first embodiment.
FIG. 2 is a view illustrating an example of a rule search condition.

First, a configuration of a search apparatus according to a first embodiment will be described using FIG. 1. FIG. 1 is a view illustrating an example of the configuration of the search apparatus according to the first embodiment. As illustrated in FIG. 1, a search apparatus 10 includes an input/output unit 11, a storage unit 12, and a control unit 13. For example, the search apparatus 10 is a communication apparatus such as a switch, router, or the like for transferring a received packet to a destination, a transfer path, and the like identified by search.

The input/output unit 11 exchanges data with other devices. For example, the input/output unit 11 receives an input of the packet via a network. The input/output unit 11 can transfer the packet to a given device. For example, the input/output unit 11 is a network interface card (NIC).

The storage unit 12 is a storage device such as a hard disk drive (HDD), a solid state drive (SSD), an optical disk, or the like. Note that the storage unit 12 may be a semiconductor memory capable of rewriting data, such as a random access memory (RAM), a flash memory, a non-volatile static random access memory (NVSRAM), or the like. The storage unit 12 stores an Operating System (OS) and various programs executed by the search apparatus 10. Further, the storage unit 12 stores various pieces of information used in the execution of the programs. The storage unit 12 includes a table storage unit 121.

The table storage unit 121 of the storage unit 12 stores a hash table and an ANY point table. The hash table is a table that corresponds to a predetermined field of the packet and has a set of a hash value from a value in the corresponding field and a pointer registered. An index in the hash table is the hash value. The ANY point table is a table that corresponds to a predetermined field and has a pointer registered.

The pointer registered in the hash table and the ANY point table of the table storage unit 121 is either or both of the pointer pointing to the hash table corresponding to a field next to the predetermined field, and the pointer pointing to the ANY point table corresponding to a field next to the predetermined field. That is, each index in the hash table and the ANY pointer table are associated with one or two pointers.

Further, the table storage unit 121 stores a START point table having a configuration similar to that of the ANY point table. Details of the hash table and each point table will be described later.

The control unit 13 controls the entire search apparatus 10. The control unit 13 is an electronic circuit such as a central processing unit (CPU), a micro processing unit (MPU), and the like; or an integrated circuit such as an application specific integrated circuit (ASIC), a field programmable gate array (FPGA), and the like. The control unit 13 has an internal memory for storing programs and control data that specify various processing procedures, and performs each processing using the internal memory. Further, the control unit 13 functions as various processing units by operating various programs. For example, the control unit 13 includes a creation unit 131 and a search unit 132.

The creation unit 131 serves to create a hash table and an ANY point table. When a hash table corresponding to the field next to the predetermined field is present, the creation unit 131 registers the pointer pointing to the hash table corresponding to the next field in the pointer. When an ANY point table corresponding to the field next to the predetermined field is present, the creation unit 131 registers the pointer pointing to the ANY point table corresponding to the next field in the pointer.

On the contrary, when the hash table corresponding to the field next to the predetermined field is not present or the ANY point table corresponding to the field next to the predetermined field is not present, the creation unit 131 registers NULL in the pointer.

The search unit 132 refers to a hash value calculated from a value in a field of a packet to be searched, and to a pointer registered in the hash table and the ANY point table, to perform hash search for a rule corresponding to the packet to be searched.

Here, rule search conditions will be described using FIG. 2. FIG. 2 is a view illustrating an example of the rule search conditions. Any of IP_SRC, IP_DST, Port_SRC, and Port_DST in FIG. 2 is a field of the packet. Note that the search conditions in FIG. 2 is an example, and the fields of the search conditions may be 5-tuple including a protocol added to those are illustrated in FIG. 2.

FIG. 2 illustrates that when IP_SRC, IP_DST, Port_SRC, and Port_DST of the packet to be searched meet the respective search conditions, a rule corresponding to the search conditions is employed. For example, the rule indicates a destination of the packet.

The search condition in each field is a specific value or ANY condition. The search condition for the field in which the specific value is set is met when the value in the field to be searched matches the specific value. On the other hand, the search condition in the field in which the ANY condition is set is always met regardless of the value in the field to be searched.

For example, when IP_SRC of the packet to be searched is "192.168.33.5", IP_DST is "192.168.21.13", Port_SRC is "24002", and Port_DST is "33002", the search conditions in the first row of FIG. 2 are met and accordingly, a rule #1 is employed. Also, for example, when IP_SRC of the packet to be searched is "192.168.10.10", IP_DST is "10.10.100.1", and Port_DST is "2600", the search conditions in the second row in FIG. 2 are met irrespective of the value of Port_SRC in which the ANY condition is set and accordingly, a rule #2 is employed.

Here, according to the conventional hash search technique, it is necessary to set a specific hash value to the index in the hash table, making it difficult to create the hash table reflecting the search conditions including the ANY condition as illustrated in FIG. 2.

On the contrary, the present embodiment speeds up rule search by using a search model having the tree structure with the combination of the hash table and the ANY point table. This search model allows hash search to be used even when the search conditions include the ANY condition.

Figure 3:
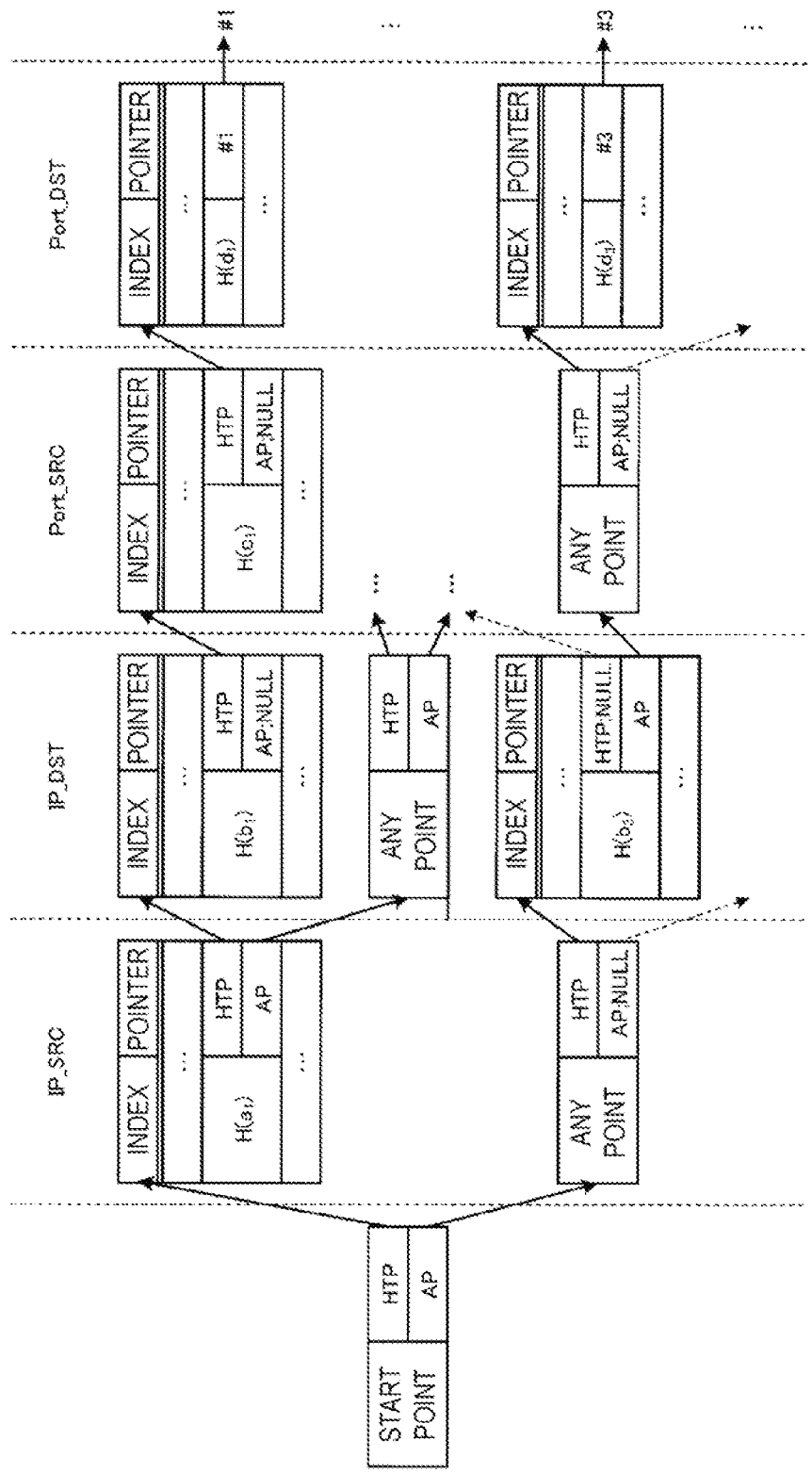
FIG. 3 is a view for describing processing of the search apparatus according to the first embodiment.

With reference to FIG. 3, tree creation processing and search processing using the tree will be described below. FIG. 3 is a view for describing processing of the search apparatus according to the first embodiment. As illustrated in FIG. 3, the tree represents the hash table and each point as a node, and the connection indicated by the pointer as an edge.

As illustrated in FIG. 3, the tree is divided into a hierarchy for each field. In the example illustrated in FIG. 3, the tree has a hierarchy corresponding to each of IP_SRC, IP_DST, Port_SRC, and Port_DST. HTP (Hash Table Pointer) is a pointer pointing to the hash table. AP (ANY pointer) is a pointer pointing to ANY point table.

The tree has a START point corresponding to a START point table as a top node. HTP pointing to the hash table for the IP_SRC field that is a first field, and AP pointing to the ANY point table for the IP_SRC field are registered in the START point table.

Note that, when the hash table corresponding to the first field is not present, NULL is registered in HTP in the START point table. When the ANY point table corresponding to the first field is not present, NULL is registered in AP in the START point table.

HTP pointing to the hash table for the IP_DST field that is a second field, and AP pointing to the ANY point table for the IP_DST field are registered in a record in which the index of the hash table for the IP_SRC field is $H(a_1)$. Note that $H(x)$ is a hash value returned by a hash function $H(\ )$ when x is an argument.

HTP pointing to the hash table for the IP_DST field that is the second field, and AP pointing to the ANY point table for the IP_DST field are registered in the ANY point table for the IP_SRC field. However, NULL is registered in AP in the ANY point table. AP in the ANY point table for the IP_SRC field becomes NULL like this when the search conditions in which both of the IP_SRC field and the IP_DST field are ANY conditions are not present as illustrated in FIG. 2.

Similarly, the hash table and the ANY point table are set for the Port_SRC field that is a third field, and the Port_DST field that is a fourth field. However, the Port_DST field is the last field here, and thus a pointer pointing to the rule is registered in each of the hash table and the ANY point table for the Port_DST field.

Based on the search conditions, the creation unit 131 creates the hash tables and the ANY point tables as illustrated in FIG. 3. The search unit 132 searches the rule corresponding to the packet to be searched using the hash tables and the ANY point tables. At that time, the search unit 132 refers to the hash table and an ANY point table that are pointed by the pointers while performing hash search using the hash table, to acquire the rules.

Processing in First Embodiment

Figure 4:
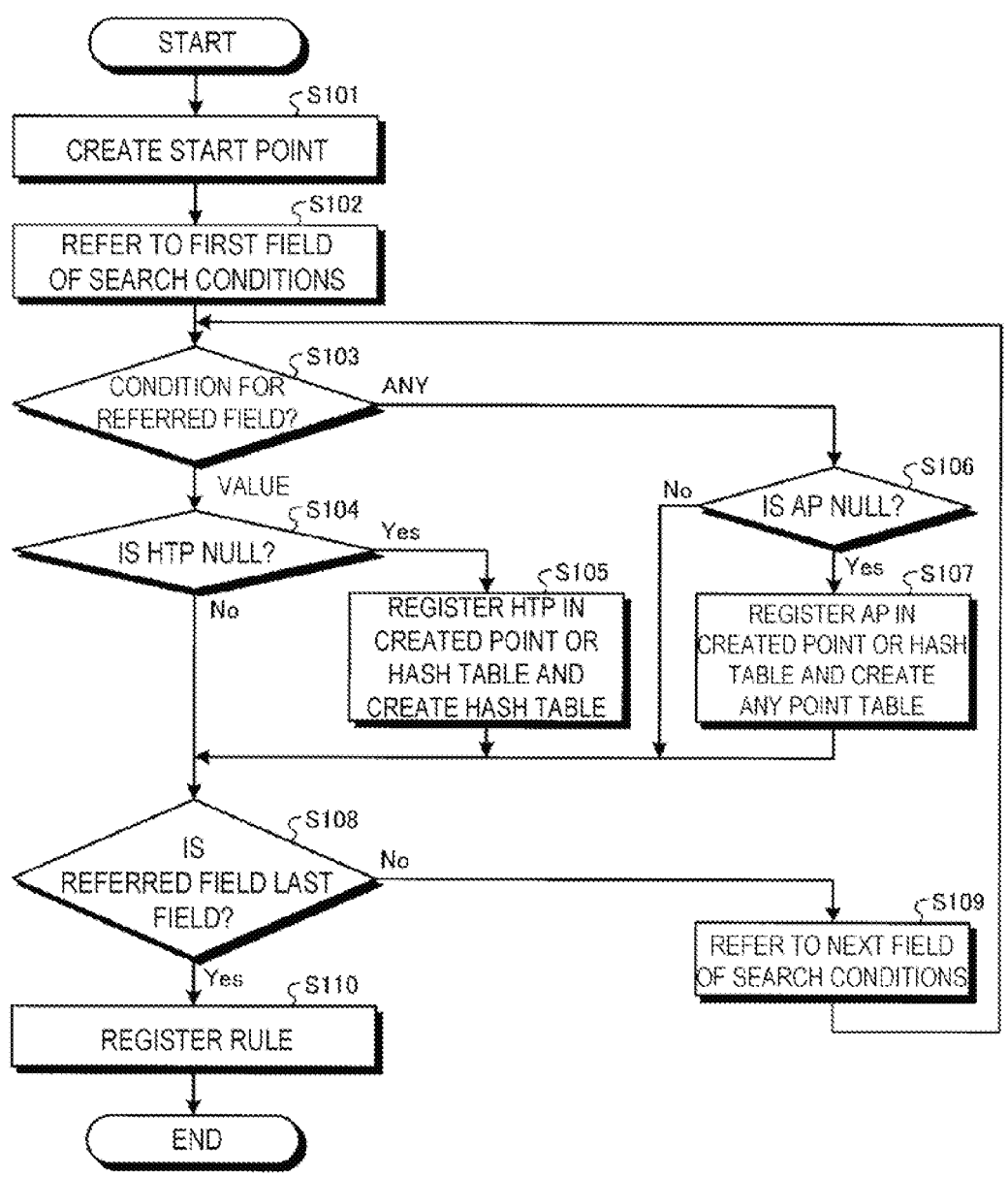
FIG. 4 is a flowchart illustrating a flow of creation processing of the search apparatus according to the first embodiment.

Creation processing of the creation unit 131 of the search apparatus 10 will be described below using FIG. 4. FIG. 4 is a flowchart illustrating a flow of the creation processing of the search apparatus according to the first embodiment. First, the creation unit 131 creates a START point (step S101). Next, the creation unit 131 refers to a first field for the search conditions (step S102).

When the condition in the referred field is a value (value in step S103) and HTP is NULL (Yes in step S104), the creation unit 131 registers HTP in the created point or the hash table, and then creates a hash table for the next field (step S105). On the contrary, when HTP is not NULL (No in step S104), the creation unit 131 proceeds to step S108 without performing step S105.

When the condition for the referred field is the ANY condition (ANY in step S103) and AP is NULL (Yes in step S106), the creation unit 131 registers AP in the created point or hash table and then creates the ANY point table for the next field (step S107). On the contrary, when AP is not NULL (No in step S106), the creation unit 131 proceeds to step S108 without performing step S107.

Then, when the referred field is the last field (Yes in step S108), the creation unit 131 registers the rule (step S110). Specifically, the creation unit 131 registers the pointer pointing to the rule corresponding to the search conditions in the hash table or ANY point table for the last field.

On the contrary, when the referred field is not the last field (No in step S108), the creation unit 131 refers to the next field of the search conditions (step S109), and returns to step S103 to repeat processing.

Figure 5:
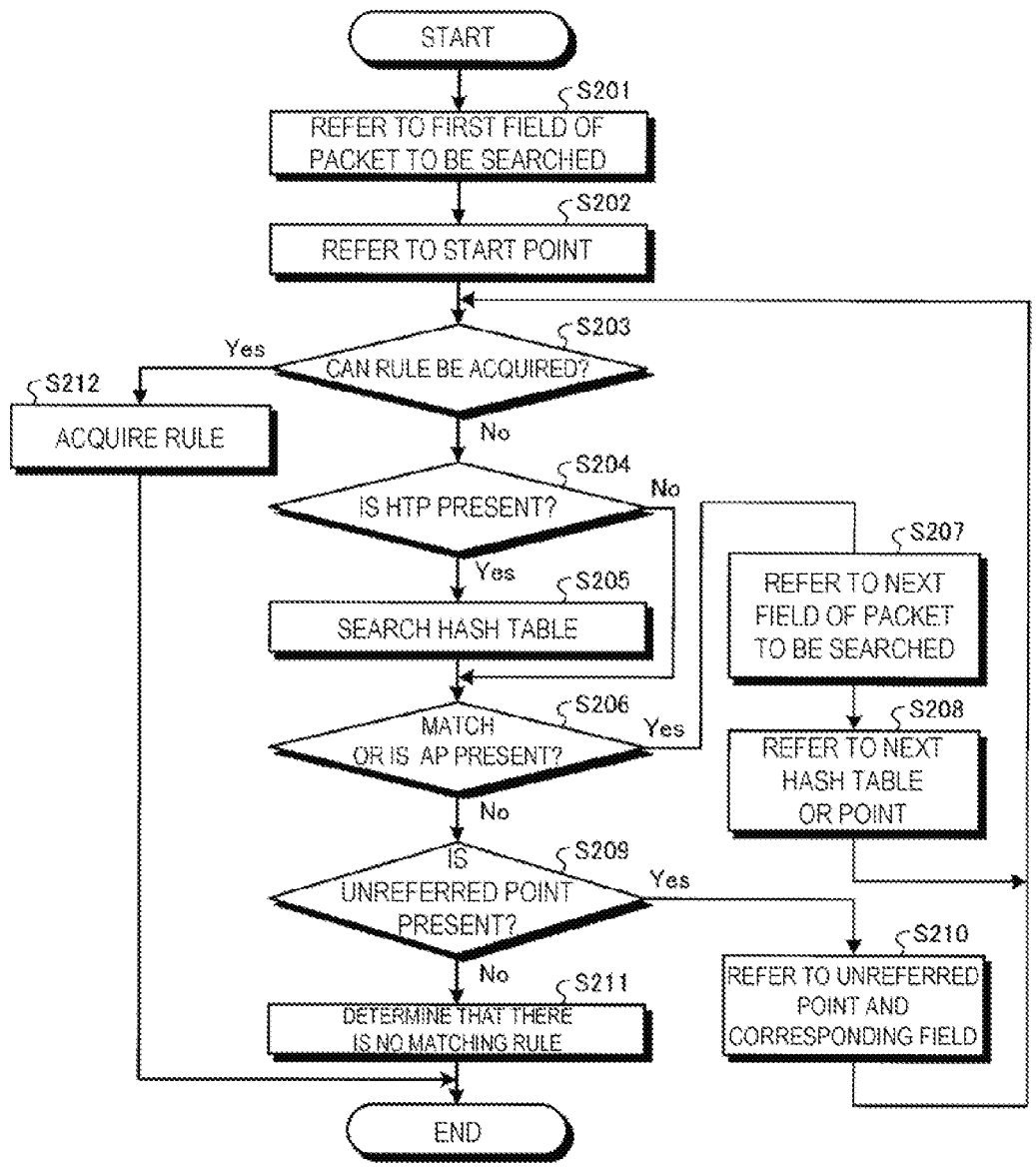
FIG. 5 is a flowchart illustrating a flow of search processing of the search apparatus according to the first embodiment.

Search processing of the search unit 132 of the search apparatus 10 will be described below using FIG. 5. FIG. 5 is a flowchart illustrating a flow of search processing of the search apparatus according to the first embodiment. First, the search unit 132 refers to a first field of the packet to be searched (step S201). Next, the search unit 132 refers to a START point (step S202).

Here, when the rule can be acquired (Yes in steps S203), the search unit 132 acquires the rule and terminates the processing (step S212). Note that "the rule can be acquired" means that the pointer in the referred hash table or point points the rule.

When the rule cannot be acquired (No in step S203), the search unit 132 checks whether or not HTP has been registered in the referred hash table or point (step S204). When HTP has been registered (Yes in step S204), the search unit 132 searches the hash table pointed by the HTP with the value in the referred field (step S205).

When there is a match in a hash table or AP has been registered in the referred hash table or point (Yes in step S206), the search unit 132 refers to the next field of the packet to be searched (step S207), refers to the next hash table or point (step S208), and returns to step S203 to repeat processing.

When there is no match in the hash table and AP has not been registered in the referred hash table or point (No in step S206), the search unit 132 checks whether or not any unreferred point is present (step S209). When an unreferred point is present (Yes in step S209), the search unit 132 refers to the unreferred point and the corresponding field (step S210) and returns to step S203 to repeat processing. When no unreferred point is present (No in step S209), the search unit 132 determines that there is no matching rule (step S211) and terminates processing.

Effects of First Embodiment

The storage unit 12 stores the hash table that corresponds to a predetermined field of a packet and has a set of a hash value from a value in the corresponding field and a pointer registered, and the ANY point table that corresponds to the predetermined field and has a pointer registered. The search unit 132 refers to a hash value calculated from a value in a field of a packet to be searched, and to a pointer registered in the hash table and the ANY point table, to perform hash search for a rule corresponding to the packet to be searched. Thus, in this embodiment, even when the ANY condition is included in the search conditions, hash search can be performed, achieving efficient search for the rule corresponding to the packet.

The storage unit 12 stores either or both of the pointer pointing to the hash table corresponding to a field next to the predetermined field, and the pointer pointing to the ANY point table corresponding to a field next to the predetermined field, as the pointer registered in the hash table and the ANY point table. By combining the hash table and the ANY point table in this manner, hash search can be performed even when the ANY condition is included in the search conditions.

The creation unit 131 creates the hash table when a value is set as the search condition among the search conditions for the value in each field of the packet to be searched, and creates the ANY point table when the ANY condition is set as the search condition. By creating the minimum required hash and ANY point tables in this manner, the usage of resources can be reduced.

When the hash table corresponding to the field next to the predetermined field is not present or the ANY point table corresponding to the field next to the predetermined field is not present, the creation unit 131 registers NULL in the pointer. This may eliminate unnecessary search.

Second Embodiment

In the first embodiment, the search apparatus 10 creates the ANY point table when the search conditions include the ANY condition. In second embodiment, when the search conditions for the second predetermined field are all ANY conditions, the search apparatus 10 does not create the ANY point table for that field.

That is, the creation unit 131 creates the ANY point table corresponding to the ANY condition only for the field in which both a value and the ANY condition are set as conditions among the fields of the packet. In other words, for the field in which only the ANY condition is set as the condition, the creation unit 131 does not create the ANY point table corresponding to the ANY condition. Note that, as a matter of course, the creation unit 131 does not create the ANY point table for the field in which only a value is set as the condition among the fields of the packet.

Figure 6:
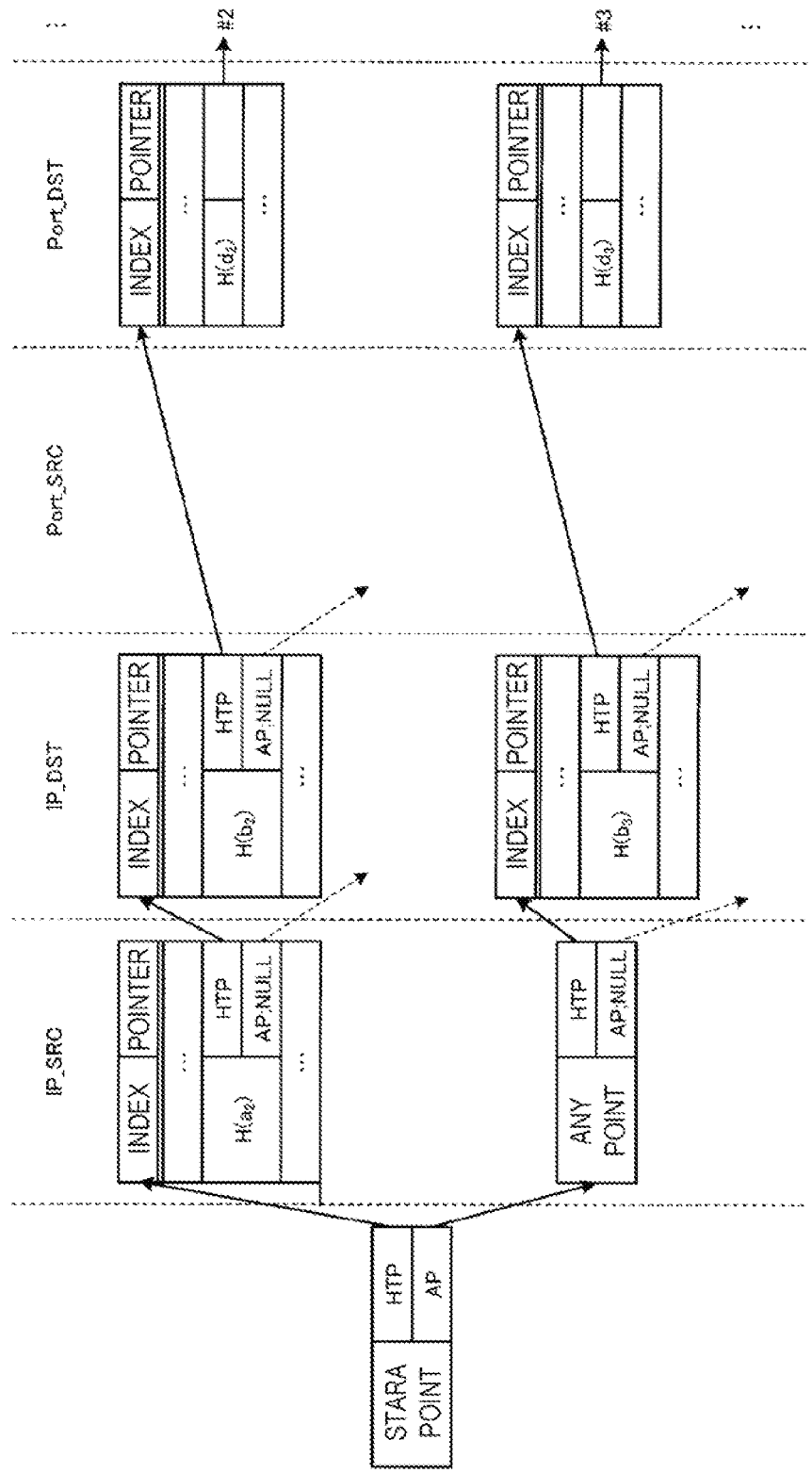
FIG. 6 is a view for describing processing of a search apparatus according to a second embodiment.

The configuration of the search apparatus 10 in the second embodiment is the same as the configuration of the search apparatus 10 in the first embodiment. However, the embodiments differ from each other in the method of creating the ANY point table by the creation unit 131. The difference between the first embodiment and the second embodiment will be described using FIG. 6. FIG. 6 is a view illustrating processing of the search apparatus according to the second embodiment.

First, as a precondition, assuming that search conditions for the Port_SRC field are all ANY conditions. For example, the precondition is met when only the search conditions in the second, third, and fifth row in the example in FIG. 2 are present.

In this case, as illustrated in FIG. 6, the ANY point table corresponding to the Port_SRC field is not created. Then, the edge from the IP_DST one preceding the Port_SRC fields is connected to the hash table for the Port_DST next to the Port_SRC field or the like.

Processing in Second Embodiment

Figure 7:
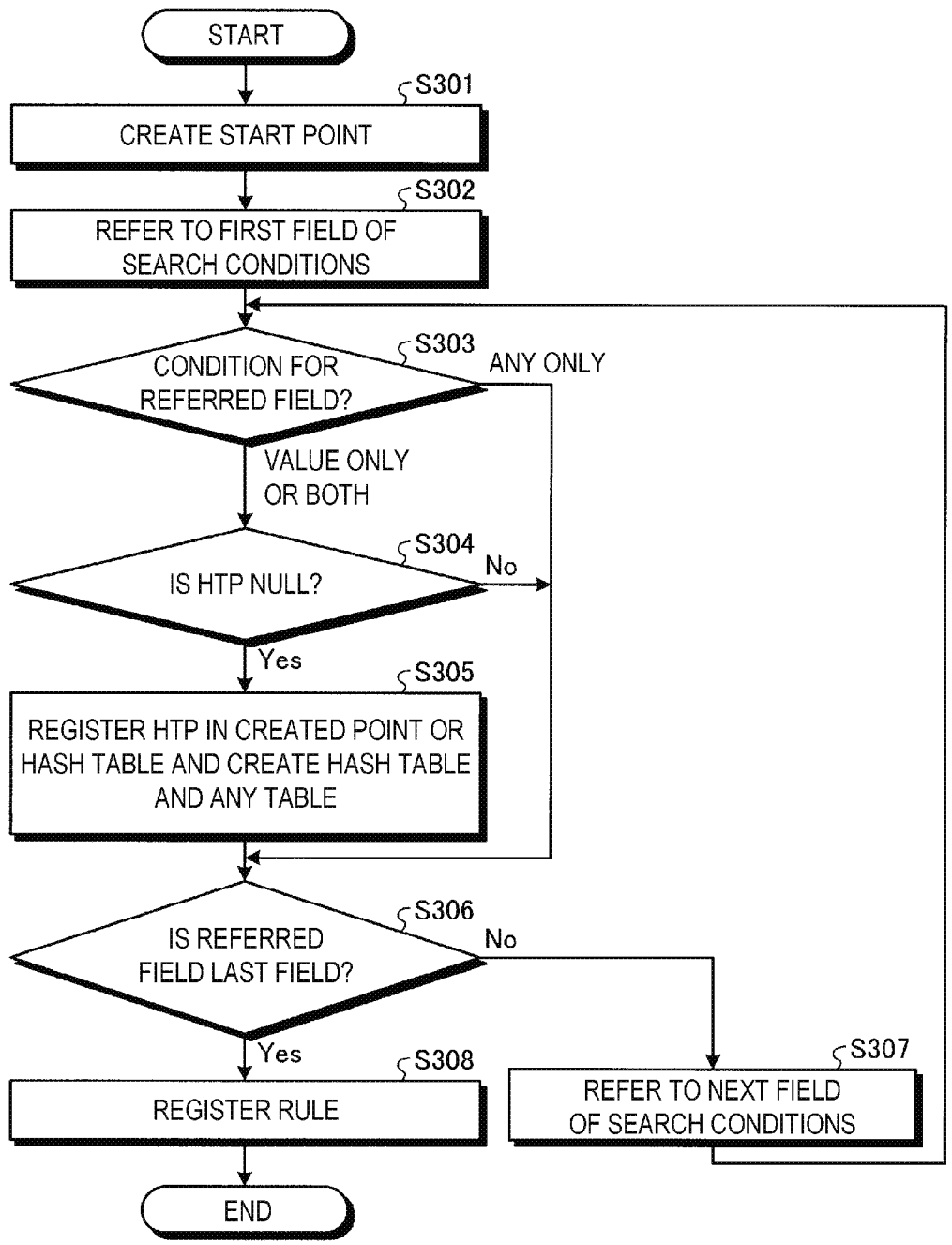
FIG. 7 is a flowchart illustrating a flow of creation processing of the search apparatus according to the second embodiment.

The creation processing of the creation unit 131 of the search apparatus 10 will be described below using FIG. 7. FIG. 7 is a flowchart illustrating a flow of the creation processing of the search apparatus according to the second embodiment. First, the creation unit 131 creates the START point (step S301). Next, the creation unit 131 refers to the first field for the search conditions (step S302).

Here, when the conditions for the referred field are only a value, or both of a value and the ANY condition (only a value or both in step S303) and HTP is NULL (Yes in step S304), the creation unit 131 registers HTP in the created point or hash table, and then creates the hash table and the ANY point table for a next field (step S305). However, in the case of only the value, the creation unit 131 creates only the hash table. On the contrary, When HTP is not NULL (No in step S304), the creation unit 131 proceeds to step S306 without performing step S305.

On the contrary, when the conditions for the referred field are only ANY conditions (ANY only in step S303), the creation unit 131 proceeds to next processing without creating the ANY point table. However, when a value is added as a search condition later, the creation unit 131 creates a hash table and n ANY point table.

Then, when the referred field is the last field (Yes in step S306), the creation unit 131 registers the rule (step S308). Specifically, the creation unit 131 registers the pointer pointing to the rule corresponding to the search conditions in the hash table or ANY point table for the last field.

On the contrary, when the referred field is not the last field (No in step S306), the creation unit 131 refers to the next field for the search conditions (step S307), and returns to step S303 to repeat processing.

Effects of Second Embodiment

The creation unit 131 creates the ANY point table corresponding to the ANY condition only for the field in which both a value and the ANY condition are set as conditions among the fields of the packet. As a result, the creation of the ANY point table can be omitted when unnecessary, and thus the usage of resources can be reduced. In addition, according to this embodiment, the number of times of referring to the pointer at the time of search can be reduced, achieving speed-up of search.

System Configuration

Also, each component of each illustrated device is functionally conceptual, and need not be physically configured as illustrated. That is, the specific form of dispersion and integration of each device is not limited to that illustrated, and all or some thereof can be configured to be functionally or physically dispersed and integrated in any unit, depending on various loads, usage conditions, and the like. Further, all or any part of each processing function performed in each device may be realized in a CPU or a program analyzed and executed by the CPU, or may be realized as hardware by wired logic.

In addition, all or some of the processing described as being automatically performed among the processing described in the embodiments of the invention can be performed manually, or all or some of the processing described as being manually performed can be performed by any suitable known method. In addition, information including the processing procedures, control procedures, specific names, and various types of data and parameters illustrated in the above documents and drawings can be modified as desired unless otherwise specified.

Program

As an embodiment, the search apparatus 10 can be implemented by installing a search program for executing the search described above on a desired computer as packaging software or online software. For example, by causing an information processor to execute the search program described above, the information processor can function as a search apparatus 10. The information processor described herein includes a desktop or notebook personal computer in addition to network equipment such as a switch, a router, or the like. In addition, the category of the information processor includes a mobile communication terminal such as a smart phone, a mobile phone, a personal handyphone system (PHS), or the like, or a slate terminal such as personal digital assistant (PDA), and the like.

Figure 8:
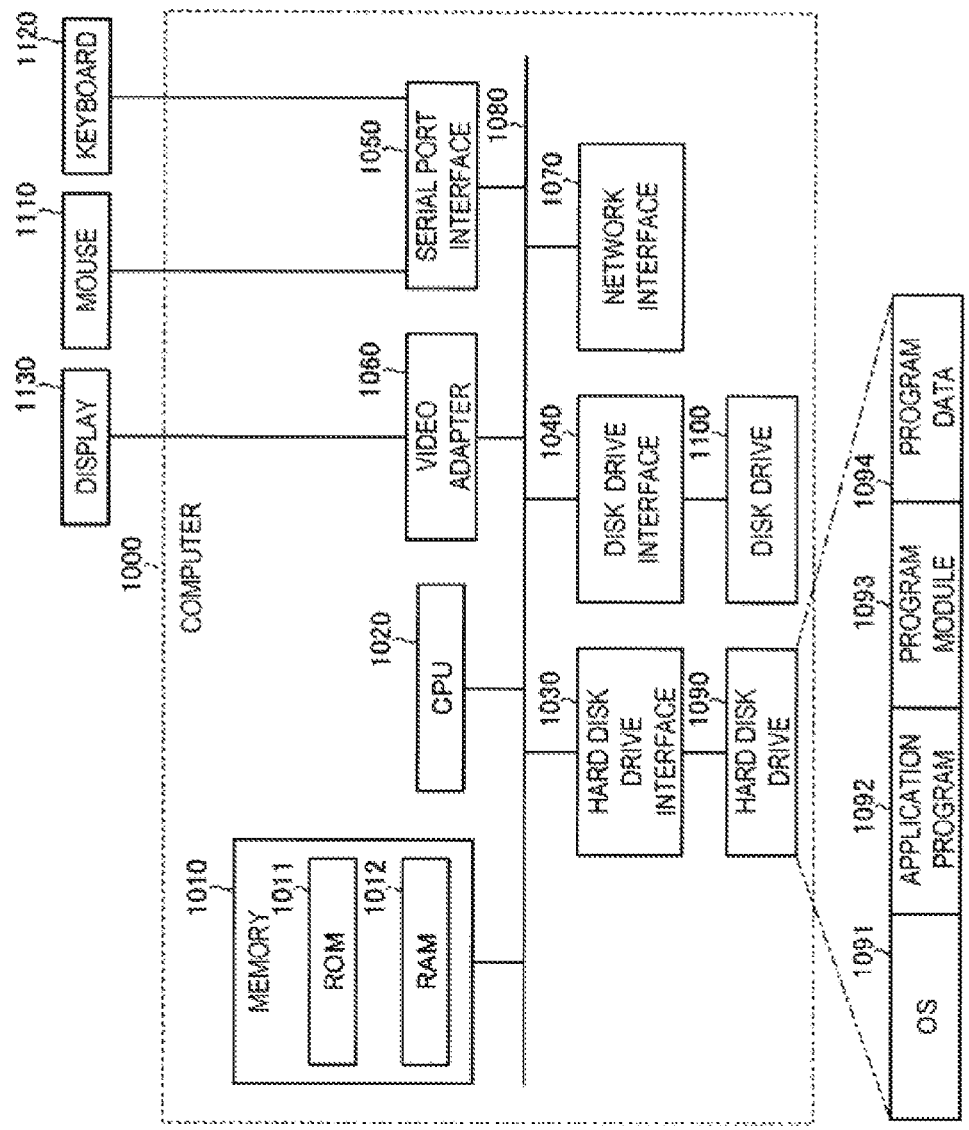
FIG. 8 is a view illustrating an example of a computer that executes a search program.

FIG. 8 illustrates an example of a computer that executes a search program. A computer 1000 has, for example, a memory 1010 and a CPU 1020. The computer 1000 also has a hard disk drive interface 1030, a disk drive interface 1040, a serial port interface 1050, a video adapter 1060, and a network interface 1070. Each of these units is interconnected with a bus 1080.

The memory 1010 includes a read only memory (ROM) 1011 and a RAM 1012. The ROM 1011 stores a boot program such as basic input output system (BIOS). The hard disk drive interface 1030 is connected to a hard disk drive 1090. The disk drive interface 1040 is connected to disk drive 1100. A removable storage medium such as a magnetic disk or optical disk is inserted into the disk drive 1100. The serial port interface 1050 is connected to, for example, a mouse 1110 and a keyboard 1120. The video adapter 1060 is connected to the display 1130, for example.

The hard disk drive 1090 stores, for example, an OS 1091, an application program 1092, a program module 1093, and program data 1094. That is, a program that specifies each processing of the search apparatus 10 is implemented as the program module 1093 in which a computer-executable code is described. The program module 1093 is stored, for example, in the hard disk drive 1090. For example, the program module 1093 for performing processing similar to that of the functional configuration in the search apparatus 10 is stored in the hard disk drive 1090. Note that the hard disk drive 1090 may be replaced with an SSD.

The setting data used in the processing of the above-described embodiments is stored, for example, in the memory 1010 and the hard disk drive 1090 as the program data 1094. The CPU 1020 reads the program module 1093 and the program data 1094, which are stored in the memory 1010 and the hard disk drive 1090, onto the RAM 1012 as necessary, and executes the processing in the above-described embodiments.

Note that the program module 1093 and the program data 1094 are not limited to being stored in the hard disk drive 1090, and may be stored, for example, in a removable storage medium, and read by the CPU 1020 via the disk drive 1100 or the like. Alternatively, the program module 1093 and the program data 1094 may be stored in other computers connected via a network (local area network (LAN), wide area network (WAN), and the like). Then, the program module 1093 and the program data 1094 may be read by the CPU 1020 from other computers via the network interface 1070.

REFERENCE SIGNS LIST

10 Search apparatus
11 Input/output unit
12 Storage unit
13 Control unit
121 Table storage unit
131 Creating unit
132 Search unit

The invention claimed is:

1. A search apparatus comprising:
   a storage unit that includes one or more processors and that is configured to store a hash table corresponding to a predetermined field of a packet, the hash table having a set of a hash value from a value for a corresponding field and a pointer registered, and a point table corresponding to the predetermined field and having a pointer registered; and
   a search unit that includes one or more processors and that is configured to refer to (i) a hash value calculated from a value for a field of a packet to be searched and a pointer registered in the hash table and (ii) the point table and a pointer registered in the point table to perform hash search for a rule corresponding to the packet to be searched,
   wherein the storage unit is configured to store at least one of (i) a pointer pointing a hash table corresponding to a field next to the predetermined field or (ii) a pointer pointing a point table corresponding to the field next to the predetermined field, as a pointer registered in the hash table and the point table,
   wherein the point table is created based on a first condition being set as a search condition, and
   wherein the search condition in the field in which the first condition is set is always met regardless of the value of the field.

2. The search apparatus according to claim 1, further comprising a creation unit configured to create a hash table based on a value being set as a search condition among the search conditions for the value in each field of the packet to be searched.

3. The search apparatus according to claim 2, wherein:
   the creation unit is configured to register NULL in the pointer based on the hash table corresponding to the field next to the predetermined field being not present or the point table corresponding to the field next to the predetermined field being not present.

4. The search apparatus according to claim 2, wherein:
   the creation unit is configured to create a point table corresponding to the first condition only for a field in which both a value and the first condition are set as conditions among the fields of the packet.

5. A search method executed by a search apparatus comprising a storage unit configured to store a hash table corresponding to a predetermined field of a packet, the hash table having a set of a hash value from a value for a corresponding field and a pointer registered, and a point table corresponding to the predetermined field and having a pointer registered, the method comprising
   searching in which hash search for a rule corresponding to a packet to be searched is performed by referring to a hash value calculated from a value for a field of the packet to be searched and to a pointer registered in the hash table and the point table and a pointer registered in the point table; and
   storing at least one of (i) a pointer pointing a hash table corresponding to a field next to the predetermined field or (ii) a pointer pointing a point table corresponding to the field next to the predetermined field, as a pointer registered in the hash table and the point table,
   wherein the point table is created based on a first condition being set as a search condition, and
   wherein the search condition in the field in which the first condition is set is always met regardless of the value of the field.

6. A non-transitory recording medium storing a program, wherein execution of the program causes one or more computers to perform operations comprising:
   storing a hash table corresponding to a predetermined field of a packet, the hash table having a set of a hash value from a value for a corresponding field and a pointer registered, and a point table corresponding to the predetermined field and having a pointer registered;
   referring to (i) a hash value calculated from a value for a field of a packet to be searched and a pointer registered in the hash table and (ii) the point table and a pointer registered in the point table to perform hash search for a rule corresponding to the packet to be searched; and
   storing at least one of (i) a pointer pointing a hash table corresponding to a field next to the predetermined field or (ii) a pointer pointing a point table corresponding to the field next to the predetermined field, as a pointer registered in the hash table and the point table,
   wherein the point table is created based on a first condition being set as a search condition, and
   wherein the search condition in the field in which the first condition is set is always met regardless of the value of the field.

7. The non-transitory recording medium according to claim 6, wherein the operations further comprise:
   creating a hash table based on a value being set as a search condition among the search conditions for the value in each field of the packet to be searched.

8. The non-transitory recording medium according to claim 7, wherein the operations further comprise registering NULL in the pointer based on the hash table corresponding to the field next to the predetermined field being not present or the point table corresponding to the field next to the predetermined field being not present.

9. The non-transitory recording medium according to claim 7, wherein the operations further comprise creating a point table corresponding to the first condition only for a field in which both a value and the first condition are set as conditions among the fields of the packet.

* * * * *